United States Patent

Bruchez, Jr. et al.

Patent Number: 5,082,182
Date of Patent: Jan. 21, 1992

[54] THRUST VECTORING EXHAUST NOZZLE

[75] Inventors: Raymond J. Bruchez, Jr., North Palm Beach; George E. Mount, Tequesta; James T. Dixon, Jupiter, all of Fla.; Russell H. Hagerman, Melville, N.Y.; Wayne K. Movick, Jupiter, Fla.; Aldo Arena, Smithtown, N.Y.; Jim D. Stewart, Sebastian, Fla.

[73] Assignees: United Technologies Corporation, Hartford, Conn.; Grumman Aerospace Corporation, Bethpage, N.Y.

[21] Appl. No.: 571,797

[22] Filed: Aug. 23, 1990

[51] Int. Cl.⁵ .............................. B64C 15/02
[52] U.S. Cl. ..................... 239/265.35; 239/265.19; 239/265.39; 239/265.41; 60/230; 60/232
[58] Field of Search ............... 239/265.19, 265.33, 239/265.35, 265.37, 265.39, 265.41; 60/228, 230, 232

[56] References Cited

U.S. PATENT DOCUMENTS

| | | | |
|---|---|---|---|
| 2,846,844 | 8/1958 | O'Rourke | 239/265.35 X |
| 3,004,385 | 10/1961 | Spears, Jr. et al. | 239/265.41 |
| 3,792,815 | 2/1974 | Swaverly et al. | 239/265.39 |
| 3,794,244 | 2/1974 | McMath | 239/265.41 |
| 3,954,225 | 5/1976 | Camboulives et al. | 239/265.41 |
| 4,128,208 | 12/1978 | Ryan et al. | 239/265.39 |
| 4,176,792 | 12/1979 | McCardle, Jr. | 239/265.41 |
| 4,181,260 | 1/1980 | Nash | 239/265.39 |
| 4,245,787 | 1/1981 | Freid | 239/265.41 |
| 4,274,593 | 6/1981 | Joubert | 239/265.35 |
| 4,363,445 | 12/1982 | Bouiller | 239/265.35 |
| 4,440,346 | 4/1984 | Wiley | 239/265.39 |
| 4,440,347 | 4/1984 | Madden et al. | 239/265.39 |
| 4,447,009 | 5/1984 | Wiley et al. | 239/265.39 |
| 4,456,178 | 6/1984 | Jones et al. | 239/265.39 |
| 4,994,660 | 2/1991 | Hauer | 239/265.41 |

Primary Examiner—Andres Kashnikow
Assistant Examiner—William Grant
Attorney, Agent, or Firm—Troxell K. Snyder

[57] ABSTRACT

An axisymmetric thrust vectoring exhaust nozzle includes a plurality of divergent flaps (30) each supported at the upstream end by a universal joint (32) and at the downstream end by a load link (34) connected to a unison ring (36) positioned by actuators (45).

5 Claims, 2 Drawing Sheets

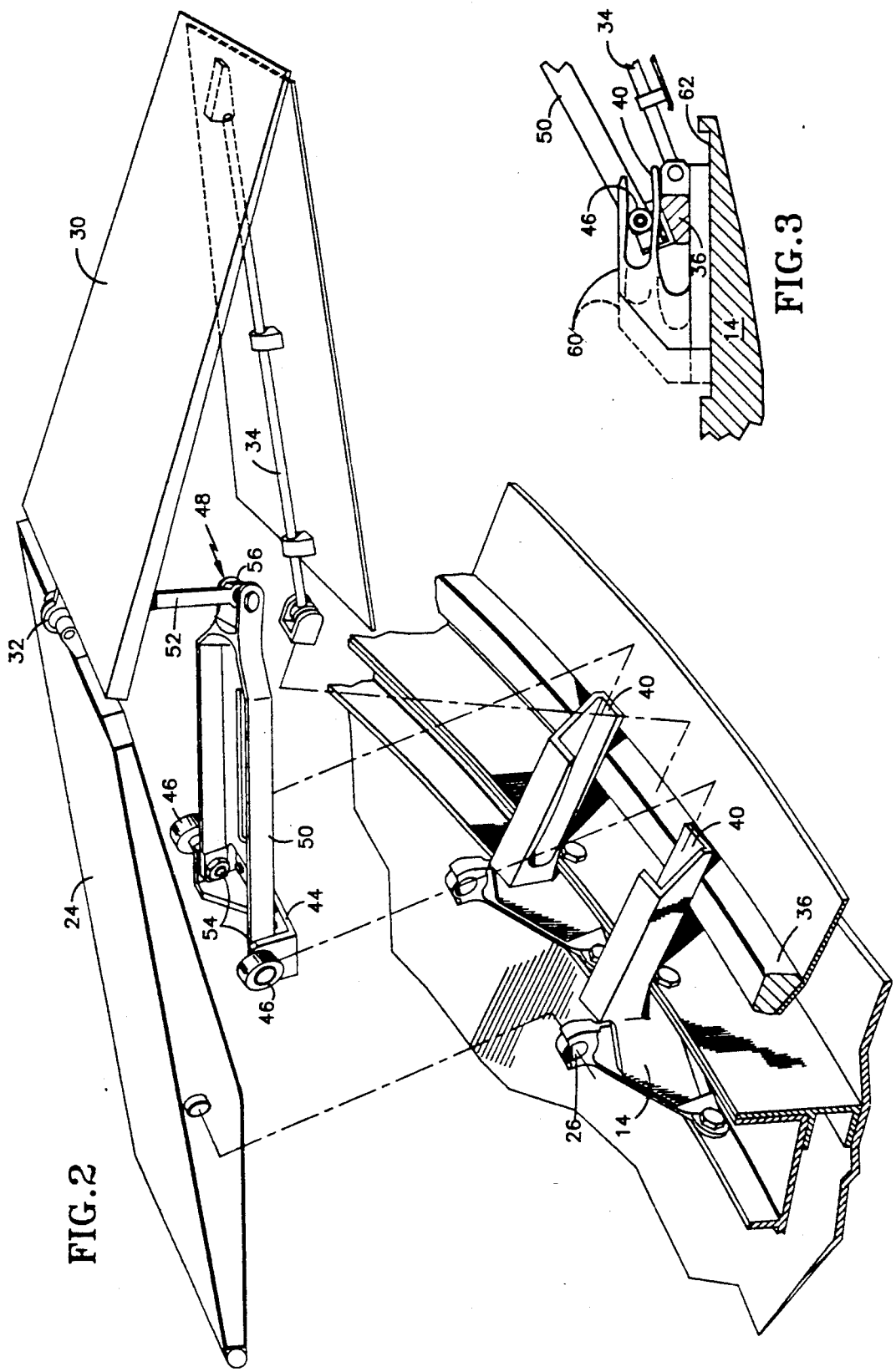

THRUST VECTORING EXHAUST NOZZLE

FIELD OF THE INVENTION

The present invention relates to an axisymmetric thrust vectoring exhaust nozzle for a jet aircraft or the like.

BACKGROUND ART

Variable geometry exhaust ducts for aircraft gas turbine engine installations frequently employ an axisymmetric arrangement of overlapping flap and seal members to define the periphery of the exhaust duct. By providing an intermediate, transverse hinge in the flap and seal members, prior art ducts have achieved convergent-divergent arrangements wherein the duct may be configured to define a variable area throat which is necessary for optimized engine performance, particularly in high speed aircraft installations using afterburning for thrust augmentation.

Such prior art axisymmetric nozzles direct the exhaust gas aftward from the aircraft generally along a central axis. Certain alternative designs exist for attempting to provide a practical arrangement for selectively diverting the exhaust gas from this axial centerline in order to achieve vectored thrust for enhancing aircraft maneuverability. Such thrust vectoring nozzle configurations have typically not been adaptable to the axisymmetric nozzles described hereinabove and further are usually limited to redirecting exhaust gas in only a single plane. An additional drawback of prior art vectoring nozzle has been the increased weight of the actuators and exhaust gas directing surfaces at the aftmost portion of the exhaust duct and aircraft, thus adding additional weight at the most undesirable location in the aircraft due to stability and balance considerations.

What is needed is a thrust vectoring exhaust duct design which is adaptable to both convergent-divergent exhaust arrangements as well as lightweight, axisymmetric configurations.

DISCLOSURE OF THE INVENTION

The present invention provides a thrust vectoring exhaust nozzle for selectively directing a stream of exhaust gas from a gas turbine engine or the like. The nozzle is particularly adapted for use in an axisymmetric convergent/divergent nozzle configuration, and may further be adapted to a cam actuated convergent nozzle section wherein the convergent flap trailing edge translates axially as nozzle throat area is varied.

According to the present invention, a plurality of divergent flap members define a vectoring exhaust duct which is selectively positioned by a coaxial unison ring supported by a spherical bearing arrangement from the nozzle static structure. The divergent flaps are each connected at their upstream end to the downstream portion of the convergent nozzle section by universal joints, and each are positioned by a load link joining the divergent flap to the unison ring.

A plurality of actuators positions the unison ring, and hence, the divergent flaps, relative to the nozzle central axis. The spherical bearing which supports the unison ring permits tilting or skewing of the ring about a center point coincident with the central axis, thereby insuring coordinated collective movement of the divergent flaps. In one embodiment of the nozzle according to the present invention, the spherical bearing, including the unison ring, translates axially for allowing the divergent flaps to be collectively contracted and expanded radially with respect to the gas stream. The axial translation of the unison ring further allows the nozzle to maintain divergent duct geometry as the convergent nozzle structure translates axially. The nozzle according to the present invention enables an aircraft to achieve enhanced maneuverability and control with few additional components and little additional weight as compared to prior art variable area, non-thrust vectoring nozzles.

BRIEF DESCRIPTION OF THE DRAWINGS

FIG. 2 shows a detailed view of a convergent and divergent flap of the nozzle of FIG. 1.

FIG. 3 shows a schematic view of a cam actuated nozzle including an axially translatable spherical bearing

DETAILED DESCRIPTION OF THE DRAWINGS

Figure 1:
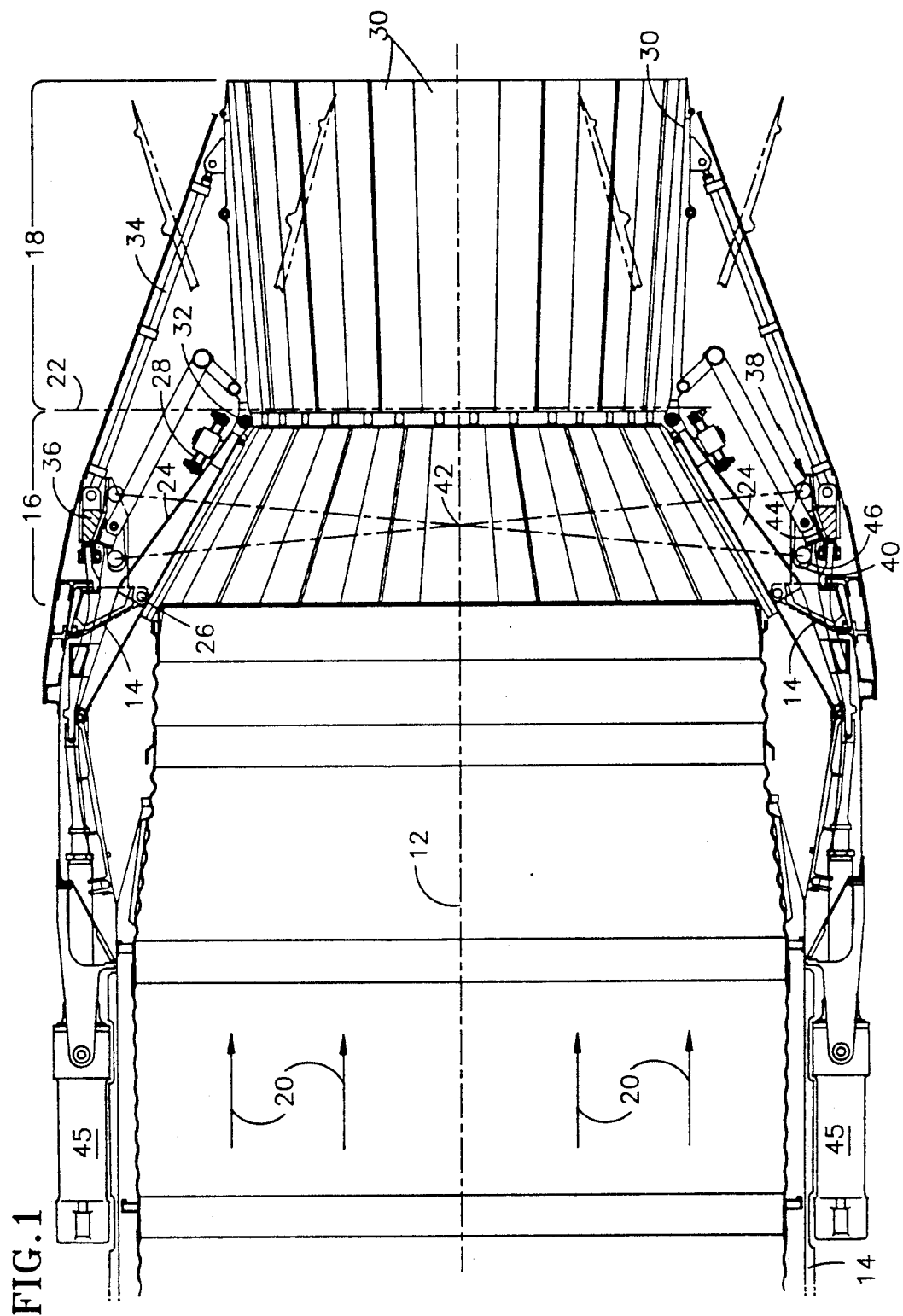
FIG. 1 shows an axial section of a nozzle according to the present invention.

FIG. 1 shows a cross-section of the first embodiment of the nozzle according to the present invention taken through the nozzle centerline 12. The nozzle comprises an upstream, static structure 14, a convergent section 16, and a divergent section 18 located immediately downstream therefrom Exhaust gases 20 flowing axially aftward enter the convergent section 16 wherein the flow area may decrease as a result of the position of the convergent flaps 24 and intermediate seals (not shown), thereby forming a minimum area throat 22 at the exit of the convergent section 16. The convergent flaps 24 shown in FIG. 1 are of the "balanced beam" arrangement wherein each convergent flap 24 is mounted at a central pivot point 26 with the plurality of convergent flaps 24 being moved collectively by a convergent actuator linkage partially shown at 28.

Exhaust gases 20 exiting the convergent section 16 enter the divergent section 18 which, according to the present invention, is comprised of a plurality of divergent flap members 30 arranged generally circumferentially about the centerline 12 and selectively reconfigurable so as to define a thrust vectoring exhaust duct as will be described hereinbelow. Each flap member 30 is connected at the upstream end thereof to the downstream end of a corresponding convergent flap by a universal joint 32. The universal joint 32 permits each flap 30 to be rotated radially inward and outward with respect to the centerline 12, as well as circumferentially. The aftward end of each flap 30 is supported by a load link 34 which is connected at one end to a downstream portion of the corresponding flap 30 and at the other end to a unison ring 36 which is disposed generally coaxially with respect to the nozzle centerline 12.

The unison ring 36 is supported by a spherical bearing, designated generally 38, which is in turn comprised of a plurality of curved bearing tracks 40 which are distributed circumferentially about the nozzle centerline and supported by the nozzle static structure 14. The spherical bearing 38 permits the unison ring 36 to pivot about a fixed centerpoint 42 located on the nozzle centerline 12 as shown. The unison ring 36 is pivoted or skewed by a plurality of actuators 45 mounted on the static structure 14. At least three actuators 45 are required to achieve full yaw and pitch vectoring. A greater number of actuators, such as 5, 6, etc., may be employed to reduce the size of each individual actuator while maintaining the full nozzle thrust vectoring capability.

The operation of the nozzle according to the present invention should now be apparent. Under normal, unvectored thrust, the unison ring 36 is disposed concentrically and aligned with respect to the nozzle centerline 12 and the divergent flaps 30 are axially symmetric with respect thereto. When thrust vectoring operation is desired, actuators 45 skew the unison ring 36 by tipping it about the fixed centerpoint 42. As one portion of the unison ring 36 is advanced forward and the other is moved aftward, corresponding flaps linked to these portions are rotated radially outward or inward with respect to the centerline 12. The reconfigured divergent duct thus redirects the flow of exhaust at an angle with respect to the nozzle centerline thereby altering the resultant thrust to the airframe (not shown). As the unison ring 36 may be tipped or rotated about any axis which may pass through the fixed centerpoint 42, yaw, pitch, or any combination of yaw and pitch thrust vectoring may be achieved.

By carefully integrating the yaw and pitch thrust vectoring nozzle according to the present invention with the attitude and stability control systems of a high performance jet aircraft, the present invention can achieve enhanced maneuverability and stability, especially at reduced speeds where ordinary aircraft control surfaces may experience airflow separation and reduction in the associated control force. Further, use of such a nozzle to trim the aircraft, instead of using trim tabs can significantly reduce aircraft drag. Initial design of an aircraft to incorporate multi-directional thrust vectoring can result in significantly smaller horizontal and vertical stabilizers with commensurate reductions in aircraft profile and friction drag.

FIG. 2 shows a detailed view of a portion of the unison ring 36, a single convergent flap 24 and a divergent flap 30. Curved bearing tracks 40 are shown secured to the static structure 14 and receiving a roller traveler 44 having rollers 46. The traveler 44 is fastened to the unison ring 36 and supports the ring as it tips with respect to the fixed centerpoint 42 (not shown in FIG. 2). Also shown in FIG. 2 is an intermediate linkage 48 which orients the divergent flap 30 circumferentially as the unison ring 36 is moved. Intermediate linkage 48 consists of first and second links 50, 52 hingedly joined to the roller traveler 44 at 54 and to each other at 56. The hinges 54, 56 are not universal joints and therefore, permit relative motion between the hinged components 44, 50 and 52 in only a single plane of action Thus, the movement of links 50 and 52 is restrained in a single plane defined as perpendicular to the axis connecting the rollers 46 of the roller member 44. Rollers 46 are aligned locally with the unison ring 36 thereby causing flaps 30 to be located not only radially inward and outward by virtue of the action of the load link 34, but also circumferentially by means of the intermediate linkage 48.

The function of the intermediate linkage 48 is best considered by referring to a thrust vectoring orientation of the divergent duct 18 wherein the upper and lower portions of the unison ring 36 are displaced respectively forward and aftward. The orthogonal portions, located laterally, of the unison ring, are thus skewed with respect of the nozzle centerline 12 causing, as described above, the roller travelers 44 fastened thereto locally to be likewise skewed. The skewing of the roller travelers 44 causes the intermediate linkage 48 to be skewed with respect to the centerline thereby forcing the corresponding attached divergent flap 30 to be rotated circumferentially about its upstream universal joint 32.

The associated divergent flap 30 thus is pivoted upward with respect to the centerline 12 while not moving radially inward or outward with respect to said centerline. The function of the intermediate linkages 48, therefore, is to provide positive circumferential orientation to the individual flap members 30 as the divergent duct 18 is reconfigured so as to redirect the exhaust gases 20 passing therethrough. Without such intermediate linkage 48, the circumferential orientation of the divergent flaps 30 is indeterminent and may therefore result in vibration, gaping, or other undesirable misalignment.

FIG. 3 shows a portion of an alternative embodiment wherein the curved track 40 is mounted in an axially translating carrier 60 which is supported by a plain bearing surface 62 on the static structure 14. By moving the carrier 50 and curved track 40 axially rearward, the nozzle according to the alternative embodiment collectively rotates the flaps 30 toward the centerline 12, thus decreasing the nozzle exit flow area and the divergent expansion angle of the divergent section 18.

The axially translating carrier structure of FIG. 3 also permits the nozzle according to the present invention to function with a cam actuated or tracked convergent section wherein the trailing edges of the individual convergent flaps 24 move axially as the throat area is varied It will be appreciated that the curved track 40 continues to support the unison ring 36 via the rollers 46 and roller member 44. It should further be noted that the intermediate linkage 48 functions equally well with the translating unison ring arrangement of FIG. 3, positioning the individual flaps 30 as the ring 36 is skewed relative to the centerline 12.

It is particularly relevant that the thrust vectoring operation of the present invention is achieved with a minimum of additional equipment and modification relative to existing convergent/divergent axisymmetric nozzles. In fact, the structure of the nozzle is essentially identical with the prior art except for structure downstream of the trailing edge of the convergent flaps 24 wherein the universal joints for supporting the divergent flaps 30 must be used to permit the divergent section to be reconfigured in a non-axisymmetric arrangement The spherical bearing, including the curved bearing tracks, the intermediate links, and the unison ring and associated actuators, are the bulk of the additional equipment required Universal joints are used at the ends of each positioning link 34 to be skewed as the divergent duct is reconfigured to divert the exiting exhaust gases 20.

The curved bearing tracks 40 further increase the accuracy of the positioning of the individual flaps 30 by supporting the unison ring 36 at multiple points about the circumference thereof, thereby insuring that each portion of the ring 36 lies in the appropriate plane passing through the centerpoint 42. The intermediate linkages 60 maintain uniform spacing between adjacent flaps thereby preventing overlapping or separation of the flap members as the nozzle duct 18 is reconfigured.

Certain nozzle designs may utilize a plurality of seal members (not shown) disposed between adjacent divergent flaps 30 for overlapping and sealing therebetween. Such seals are typically secured at the upstream end thereof to corresponding seals in the divergent section 16 and are supported relative to the downstream portions of the divergent flaps by clamps on the exterior and by exhaust gas pressure at the interior surface. Such seal members may include centering means for positioning each seal relative to the adjacent flaps 30, however, the intermediate linkages 48 of the present invention still function to position the individual flaps between which the seal members are located.

The present invention is thus well suited to provide a simple, light weight, thrust vectoring axisymmetric nozzle arrangement which is easily adapted to current and future gas turbine powered airframes.

We claim:

1. An exhaust nozzle for selectively varying the direction of discharge of a stream of exhaust gas, comprising:
   an exhaust duct having an upstream entry end and downstream discharge end, including,
   a plurality of flaps defining the perimeter of the exhaust duct, each flap disposed adjacent two other flaps and extending from the entry end to the discharge end, each flap secured at the upstream end thereof to a supporting universal joint,
   means, disposed between an upstream static structure and each flap, for selectively positioning said flap to the corresponding universal joint, wherein the positioning means further includes
   a unison ring, disposed generally coaxially with respect to the exhaust duct,
   a plurality of elongated load links, each load link secured at one end thereof to the unison ring and at the other end thereof to one of the flaps, and
   means for axially positioning and orienting the unison ring, wherein the unison ring is supported by a plurality of curved bearing tracks races supported from the static structure, the bearing tracks distributed about the circumference of the unison ring and each track configured to describe a curved path with respect to the centerpoint of the unison ring.

2. The nozzle as recited in claim 1, wherein
   the unison ring is supported in the bearing tracks by a plurality of rollers, each roller being received within an individual curved bearing track.

3. The nozzle as recited in claim 1, further comprising,
   a plurality of intermediate linkages, each intermediate linkage extending between the unison ring and a flap, each linkage further including a first link hingedly secured to the unison ring and rotatable with respect thereto only in a plane passing through the centerpoint of the unison ring,
   a second link, hingedly connected to the first link opposite the unison ring, said second link rotatable only in the rotation plane as defined between the first link and the unison ring, and wherein
   the second link is secured to the corresponding divergent flap at an end opposite the hinged connection thereof with the first link.

4. The nozzle as recited in claim 3, wherein
   each first link of each intermediate linkage is disposed between two adjacent rollers and supported thereby, each of said rollers further being received by a corresponding curved bearing track.

5. The nozzle as recited in claim 1, further comprising,
   means for uniformly axially translating the curved bearing tracks relative to the nozzle centerline.

* * * * *